United States Patent
Von Scheele et al.

(10) Patent No.: US 6,923,129 B2
(45) Date of Patent: Aug. 2, 2005

(54) METHOD AND TREATMENT OF SLUDGE HAVING PARTICLES COMPRISING METAL, METAL OXIDE OR METAL HYDROXIDE INTERMIXED THEREIN

(75) Inventors: Joachim Von Scheele, Taby (SE); Mats Johansson, Lidingo (SE); Lennart Rangmark, Alvsjo (SE)

(73) Assignee: AGA Aktiebolag, Lidingo (SE)

( * ) Notice: Subject to any disclaimer, the term of this patent is extended or adjusted under 35 U.S.C. 154(b) by 0 days.

(21) Appl. No.: 10/467,840

(22) PCT Filed: Feb. 21, 2002

(86) PCT No.: PCT/SE02/00303
§ 371 (c)(1),
(2), (4) Date: Jan. 26, 2004

(87) PCT Pub. No.: WO02/066895
PCT Pub. Date: Aug. 29, 2002

(65) Prior Publication Data
US 2004/0112264 A1 Jun. 17, 2004

(30) Foreign Application Priority Data
Feb. 22, 2001 (SE) .............................................. 0100597

(51) Int. Cl.$^7$ ................................................. F23L 7/00
(52) U.S. Cl. ...................................................... 110/348
(58) Field of Search ................................ 110/238, 348, 110/260, 261, 262, 263, 264, 265; 75/414, 10.19, 961

(56) References Cited

U.S. PATENT DOCUMENTS

| | | | | |
|---|---|---|---|---|
| 4,329,170 A | * | 5/1982 | Schummer et al. | ............ 75/414 |
| 5,129,333 A | | 7/1992 | Frederick et al. | |
| 5,217,362 A | * | 6/1993 | Thompson et al. | ............ 431/11 |
| 5,405,537 A | * | 4/1995 | Goff et al. | ................... 210/739 |
| 5,843,204 A | * | 12/1998 | Ishikawa et al. | .............. 75/414 |
| 6,155,182 A | * | 12/2000 | Tsangaris et al. | ........... 110/255 |
| 6,200,428 B1 | * | 3/2001 | VanKouwenberg | ......... 202/160 |

FOREIGN PATENT DOCUMENTS

| | | |
|---|---|---|
| DE | 2460799 A1 | 6/1976 |
| DE | 4241283 A1 | 6/1994 |
| DE | 4401563 C1 | 2/1995 |
| DE | 19947343 A1 | 4/2001 |

* cited by examiner

*Primary Examiner*—Kenneth Rinehart
(74) *Attorney, Agent, or Firm*—Pearne & Gordon LLP

(57) ABSTRACT

A method for treatment of sludge is disclosed, wherein the sludge has a liquid part and metal-containing particles intermixed therein. The particles comprise metal, metal oxide or metal hydroxide and the method comprises the following steps: atomising the sludge; supplying the atomised sludge to a flame of a burner provided in a furnace; bringing the liquid part of the sludge to vaporize by means of the flame while maintaining said flame by means of a separate fuel supply; and bringing at least part of the metal-containing particles to melt by means of the flame. This provides an efficient method for taking care of waste material from plants in the steel or petrochemical industry, for example.

7 Claims, 2 Drawing Sheets

METHOD AND TREATMENT OF SLUDGE HAVING PARTICLES COMPRISING METAL, METAL OXIDE OR METAL HYDROXIDE INTERMIXED THEREIN

This application claims the benefit of International Application Number PCT/SE02/00303, which was published in English on Aug. 29, 2002.

FIELD OF INVENTION

The present invention relates generally to a method and an apparatus for treatment of sludge and more particularly a method and an apparatus for treatment of sludge having particles comprising metal, metal oxide or metal hydroxide-intermixed therein.

BACKGROUND

Sludge or slurry having waste materials intermixed therein poses a problem in today's industry. In the metallurgical industry, there is no suitable way of treating sludge from coke plants, blast furnaces, converters and rolling mills, for example oil-contamined scales and hydroxides from pickling. In most cases, these materials are deposited in some intermediate storage or taken to a landfill. Another area in which the problem of recovering materials is present is the petrochemical industry, wherein a waste product in the form of sludge is created.

The pressure from both public authorities and customers to find new solutions is constantly increasing. The earlier solution of land-filling is no longer a feasible solution and is in many countries illegal. Existing techniques for conversion and recovery are costly.

From an economic and environmental point of view, recovery is often a preferred solution to the above-mentioned problem of taking care of the waste material. However, recovery often means some kind of external processing, resulting in transportation to plants and processes lying beside the normal chain of processes.

A known solution to these problems is pelletization or briquetting of the waste material for subsequent feeding to a furnace. However, this solution is accompanied with the problem of extra costs for a separate plant for drying and subsequent pelletization of the waste material.

The patent document DE 24 60 799 discloses a method of burning oil containing metal particles. The object of the disclosed method is the destruction of the oil while avoiding unwanted exhaust particles. The burning relies solely on the energy supplied by the oil itself.

The patent document DE 42 41 283 discloses a process of gasification wherein particles are recovered. No separate fuel supply is provided.

SUMMARY OF THE INVENTION

An object of the present invention is to provide an improved method and apparatus for treatment of sludge and more particularly a method and an apparatus for treatment of sludge having particles comprising metal, metal oxide or metal hydroxide intermixed therein wherein the above-mentioned drawbacks with known techniques are avoided or at least mitigated.

The invention is based on the realisation that the wet material can be fed directly to the flame of a burner wherein vaporisation is effected and metal-containing particles are melted.

According to a first aspect of the present invention there is provided a method for treatment of sludge as defined in claim 1.

According to a second aspect of the present invention there is provided an apparatus for treatment of sludge as defined in claim 8.

With the method and the apparatus according to the invention, the problems of prior art are overcome or at least mitigated. Instead of requiring a separate drying step, the wet material is treated directly in a furnace, saving costs for extra equipment and also resulting in a shorter treatment time.

BRIEF DESCRIPTION OF DRAWINGS

The invention is now described, by way of example, with reference to the accompanying drawings, in which.

DETAILED DESCRIPTION OF THE INVENTION

In the following, a detailed description of the method and the apparatus according to the invention will be given. In the following description the term sludge is used for the material supplied to the apparatus. However, it will be appreciated that this term includes other materials, such as slurry, slime, or mud comprising carbon containing particles, including coke, char etc., and oil residue, waste from the crude oil production, refineries, and petrochemical industries, sewage sludge etc. Also, in the preferred embodiment the metal content of the sludge is at least 5%, more preferably at least 20%, and most preferably at least 50%.

Figure 1:
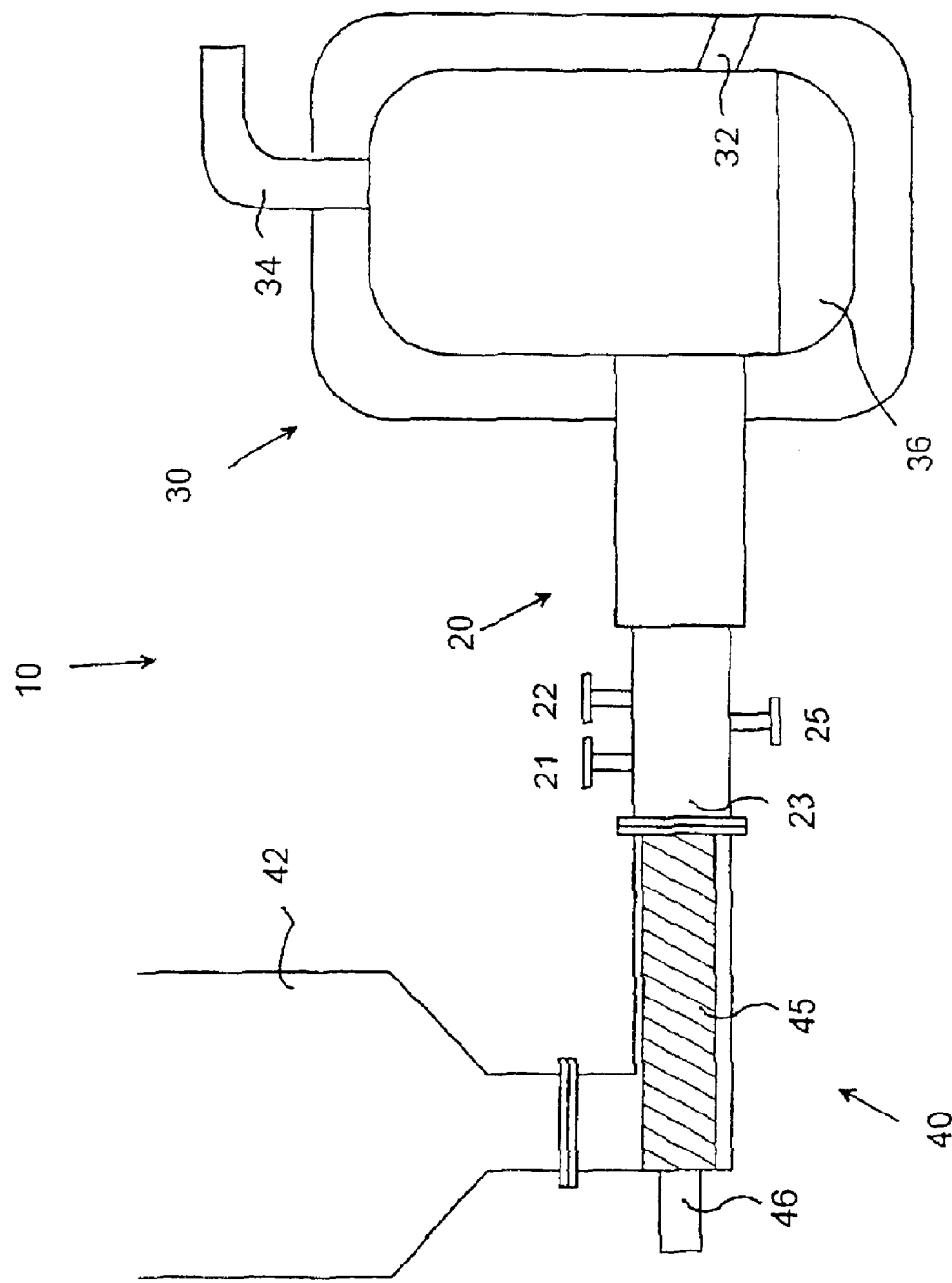
FIG. 1 is a schematic diagram of a plant according to the invention for treatment of sludge and other wet waste materials.

Starting with FIG. 1, an overall diagram of a plant for treatment of sludge and other wet waste materials, generally designated 10, is shown. The plant is built around a burner 20 installed in a side-wall of a furnace 30. The burner is a so-called oxy-fuel burner and is thus supplied with fuel through a first feeding line 21 and with oxygen through a second feeding line 22. By oxygen is in this context meant a gas with an $O_2$ content exceeding 21% and preferably so-called technical oxygen having an $O_2$ content of approx. 90–100%.

Sludge is supplied to the burner through a third feeding line 23. The third feeding line 23 is connected to a feeder, generally designated 40. The feeder 40 comprises a container 42, into which the wet starting material in the form of sludge is fed. The sludge is directed from the container 42 to an arrangement comprising a feeding pump 45 driven by a motor 46. By means of the feeding pump 45, the sludge is moved to the burner 20 at a rate determined by the speed of the feeding pump.

The burner 20 is also supplied with a suitable medium for atomising the sludge, such as oxygen or another gas etc. This atomising medium is supplied to the burner from a source (not shown) through the input 25.

In the exemplary plant shown in FIG. 1, the furnace 30 is a separate unit having an outlet 32 near the lower portion thereof for the output of molten metal containing particles recovered by the treatment of the sludge. The furnace also comprises an exhaust outlet 34 in the upper portion thereof for the output of exhausts created from the vaporisation and combustion of the sludge during burning. In the bottom of the furnace there is gathered a charge 36 resulting from the material supplied to the furnace 30 through the burner.

Figure 2:
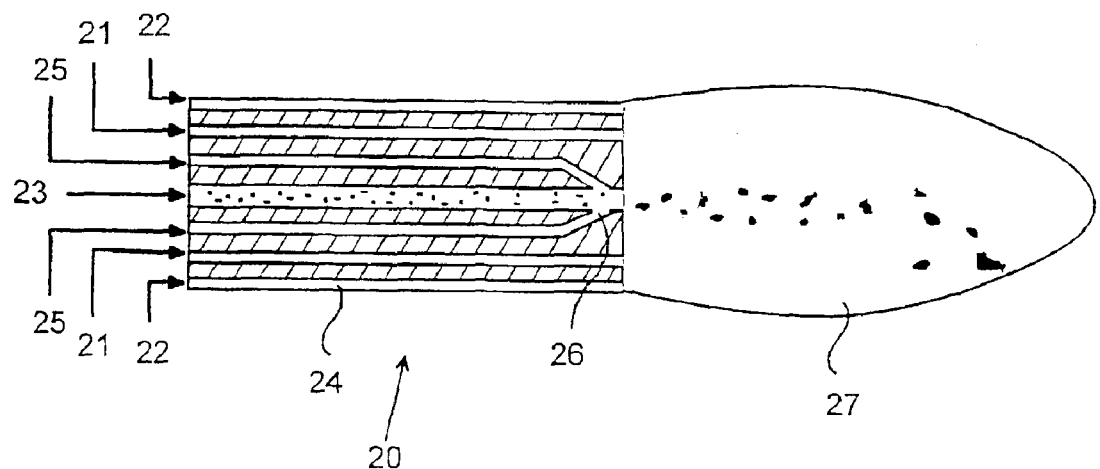
FIG. 2 is a sectional view of a burner used with the method according to the invention.
Figure 3:
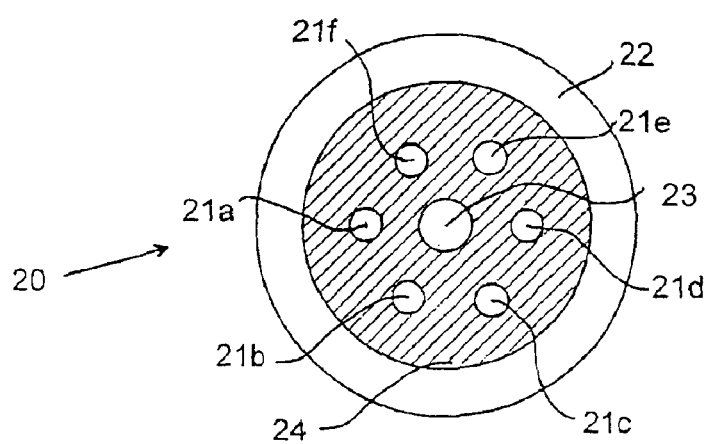
FIG. 3 is a schematic front view of the burner shown in FIG. 2.

A first embodiment of the burner 20 will be described in more detail below with reference to FIGS. 2 and 3, wherein FIG. 2 is a sectional view of the front portion of the burner and FIG. 3 is a front view. This burner is adapted to be used with fuel in the form of a gas, such as propane, natural gas, or butane, or with oil fuel.

The burner 20 comprises a main portion 24, to which the supply lines 21–23 and 25 shown in FIG. 1 are connected. The portion 24 is provided with an essentially circular cross-section, see FIG. 3, in which the configuration of the supply lines 21–23 appears in more detail. Fuel is supplied through the first supply line 21 in the form of six equidistant pipes 21a–f placed at a constant distance from the centre axis of the main portion 24. Oxygen is supplied through an annular outer portion 22 and thus surrounds the fuel supplied through the pipes 21a–f. Finally, sludge is supplied through the pipe 23, which is co-axially placed in the burner.

In the pipe 23 for the sludge, there is provided an atomising arrangement, designated 26. This functions in the following way. The atomising medium, such as oxygen, is input to the burner at 25 through a number of pipes. These pipes end in the central pipe 23 for the sludge and connect thereto in an angle thereto, thereby atomising or dividing the sludge leaving the pipe 23.

As already mentioned, the burner 20 is mounted in the side-wall of the furnace 30. In the preferred embodiment, the burner can be tilted, i.e., can be positioned in different angles relative to the horizontal and the vertical. The different orientations can be used for obtaining desired characteristics for the burning process.

In the following, the method for treatment of sludge will be described in detail.

Initially, sludge is supplied to the container 42 of the feeder 40. The sludge is of the above mentioned character, i.e., it has a liquid part and metal-containing particles intermixed in that liquid part. The metal-containing particles comprise metal, metal oxide or metal hydroxide.

The sludge is transferred from the container and into the feeding pump 45, wherein it is transported to the burner 20 by means of the pump 45. The rate by which the sludge is fed to the burner is determined by the speed of the feeding pump 45.

The operation of the oxy-fuel burner 20 is controlled by means of the amount of fuel and oxygen supplied through the first and second supply lines 21 and 22, respectively. The supply lines are connected to sources of fuel and oxygen (not shown), as is conventional. A source of atomising medium is also connected to the burner through input 25.

The operation of the burner 20 will now be described in detail with reference to FIGS. 2 and 3, showing a gas or oil burner. Sludge is supplied through the central feeding pipe 23 at a rate that is controlled by the feeding pump. Before reaching a flame 27 resulting from the oxy-fuel mixture and possibly fuel contained in the sludge, the sludge is atomised by means of the atomiser 26. In some cases, the combustion can be maintained by energy contained in the sludge and in those cases the fuel supplied through the supply line 21 is used mainly for starting the combustion. Thus, the sludge leaving the front portion of the burner is divided into small fractions, making an efficient heating thereof possible.

Fuel is supplied in the feeding pipes 21a–f, see FIG. 3, while an envelope of oxygen is supplied through the annular feeding area 22. The oxy-fuel mixture results in the flame 27 having properties, such as length, temperature etc., that are controlled by the supply rate of fuel and oxygen. The higher the oxygen content, the higher the temperature, resulting in a theoretical flame temperature of approx. 1500° C. or more. Thus, the sludge is injected into the central portion of the flame.

As is seen from FIG. 2, the metal containing particles of the sludge injected into the flame is brought to agglomerate, thus creating agglomerates of a larger size than the particles found in the sludge. The agglomeration process is controlled by means of several parameters, of which can be mentioned: temperature and velocity of the flame 27, energy content or density of the injected sludge, stoichiometry, i.e., the ratio oxidising gas to added fuel, the oxygen content of the oxidising gas, the supply rate of oxygen and added fuel, the rate of injection of sludge and its characteristics, the travel time of the sludge in the flame, and burner characteristics and configuration, such as tilting.

The wet part of the sludge is vaporised by the high temperature of the flame, resulting in exhausts rising through the furnace 30 and subsequently leaving through the exhaust outlet 34. The created agglomerates and droplets fall to the bottom of the furnace 30, wherein they are added to the charge 36. The charge is subsequently used in liquid or solid phase as it is. Alternatively the charge is returned to a process.

A preferred embodiment of the method and the apparatus according to the invention has been described. The person skilled in the art realises that this can be varied within the scope of the appended claims. Thus, although an oxy-fuel burner 20 has been shown, other conventional burners can be used, such as plasma burners or in some cases air-fuel burners having a high thermal efficiency.

Furthermore, a separate furnace unit 30 has been shown. The method according to the invention is equally applicable to other kinds of furnaces, such as electric arc furnaces, induction furnaces, reverberatory furnaces, electrically heated furnaces, blast furnaces, cupola furnaces, and converters etc.

Also, in the described embodiment, the burner is positioned in a side-wall of a furnace. However, it is realised that other suitable positions are possible, such as in the upper part of the furnace. Also, a configuration with more than one burner is possible. It is then possible to inject the atomised sludge between three burner flames, for example.

In the described embodiment, the sludge is fed to the furnace by means of a feeding pump. However, the sludge supplied to the furnace could also be free-flowing etc.

A specific burner configuration has been shown. It is also appreciated that any suitable burner configuration having different number of pipes etc can be used.

A separate input for atomising medium has been described. It is realised that the same oxygen source can be used for both the atomising medium and the burner feed.

What is claimed is:

1. A method for treatment of sludge, said sludge having a liquid part and metal-containing particles intermixed therein, wherein said particles comprise metal, metal oxide or metal hydroxide, said method comprising the following steps:
    a) atomising said sludge;
    b) supplying said atomised sludge to a flame of a burner provided in a furnace;
    c) bringing the liquid part of said sludge to vaporise by means of said flame while maintaining said flame by means of separate fuel supply; and
    d) bringing at least part of said metal-containing particles to melt by means of said flame, wherein the metal content of said sludge is at least 5%.

2. The method according to claim 1, comprising the additional step of:
    e) recovering said metal-containing particles in liquid or solid phase.

3. The method according to claim 1 or 2, wherein said burner is an oxy-fuel burner.

4. The method according to claim 1 or 2, wherein said burner is a plasma burner.

5. The method according to claim 1, wherein the metal content of said sludge is at least 20%, and must preferably at least 50%.

6. The method according to claim 1, wherein said sludge is a waste product from a process.

7. The method according to claim 1, wherein said flame is maintained mainly by energy contained in said sludge.

* * * * *